June 19, 1923.

K. W. HEYMAN

KNIFE SHARPENER

Filed June 17, 1921

1,458,938

2 Sheets-Sheet 1

INVENTOR;
Knut W. Heyman
BY Wm Wallace White
ATT'Y.

June 19, 1923.
K. W. HEYMAN
KNIFE SHARPENER
Filed June 17, 1921
1,458,938
2 Sheets-Sheet 2
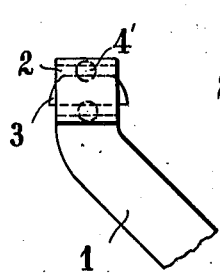
Fig.5.
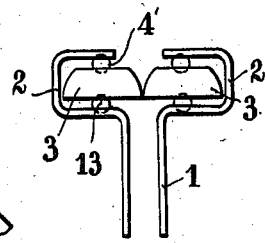
Fig.6.
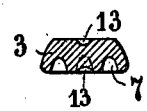
Fig.7.
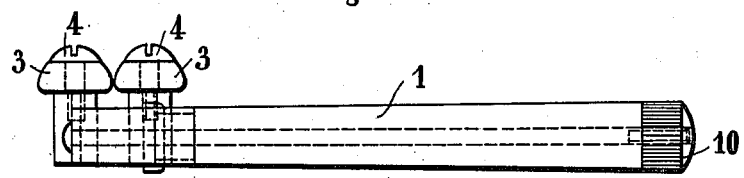
Fig.8.
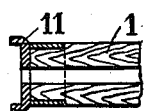
Fig.9.
Fig.10. Fig.11.
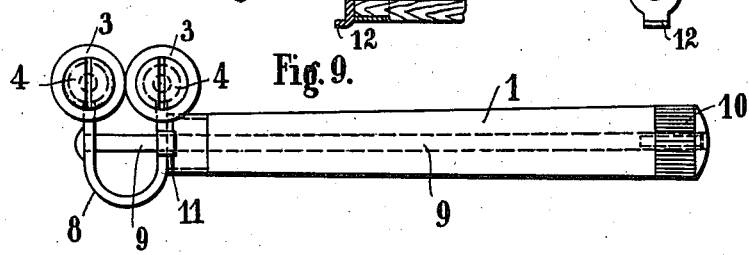
INVENTOR:
Knut W. Heyman
By Wm Wallace White
ATTY.

Patented June 19, 1923.

1,458,938

UNITED STATES PATENT OFFICE.

KNUT WALDEMAR HEYMAN, OF STOCKHOLM, SWEDEN.

KNIFE SHARPENER.

Application filed June 17, 1921. Serial No. 478,227.

*To all whom it may concern:*

Be it known that I, KNUT WALDEMAR HEYMAN, subject of the King of Sweden, residing at Stockholm, in the Kingdom of Sweden, have invented certain new and useful Improvements in Knife Sharpeners, of which the following is a specification.

The invention relates to a tool or device for sharpening the blades of knives or other similar cutting instruments of that class in which the blade is drawn along bodies of a harder material than the steel of the blade which is sharpened thereby. The new or improved tool or appliance consists essentially of a pair of contacting disks of considerable thickness or rollers of harder material than the usual knife steel and provided with bevelled or spherical circumferential surfaces, arranged upon a suitable handle in such a manner that the blade may be drawn with its cutting edge along between them in the direction of their axes of rotation when they remain stationary and the blade is sharpened or ground simultaneously on both sides, or at substantially right angles to their axes, when the disks act as rollers revolve and displace the material of the blade towards the cutting edge and thus smooth the cutting edge of the blade. The invention consists in the novel features of construction and combination of parts hereinafter described and claimed.

Figure 1:
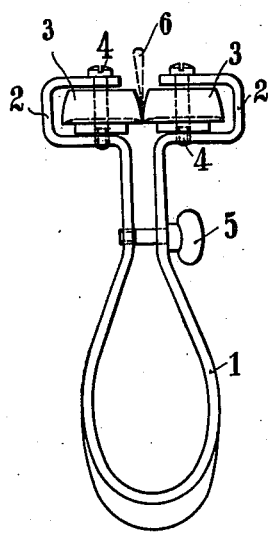
Figure 2:
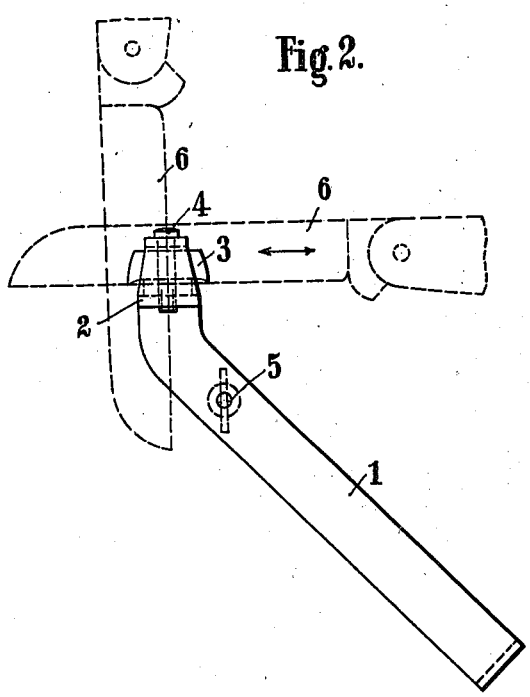
Figure 3:
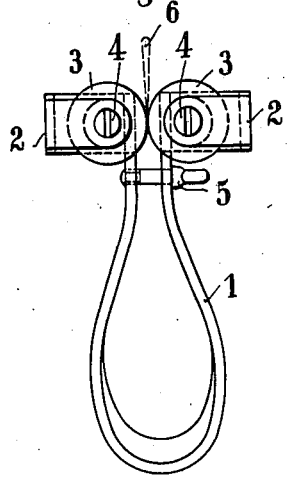

The accompanying drawings show:

Fig. 1 is a front-elevation of the tool,

Fig. 2 a side-elevation,

Fig. 3 a plan and

Figure 4:
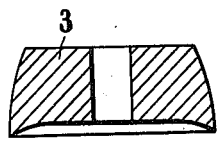

Fig. 4 a cross-section through one of the disks on a larger scale.

Figs. 5, 6 and 7 illustrate some slightly modified details of the tool according to the preceding figures, Fig. 8 the preferred construction of the tool in side-elevation, Fig. 9 a corresponding plan and Figs. 10 and 11 some details of this modification.

Similar figures of reference indicate similar parts throughout the drawings.

Referring to Figs. 1–7 of the drawings, 1 is a handle provided with bows 2, 2 between the branches of which the disks or rollers 3 are disposed. These disks 3 are made of very hard steel or the like and are rotatably mounted upon vertical pins 4, 4 which are adapted to be easily removed and replaced to facilitate the exchange of the disks. The edges of the disks or rollers are bevelled or preferably spherically shaped, as clearly shown in Fig. 4 and make contact at their widest diameters. At the underside they are preferably recessed or dished to give them sharp edges. The contact pressure between the disks can be regulated by means of the screw 5. In the drawings a pocket knife is shown during the sharpening process, the blade 6 being passed between the disks. The tool operates in the following manner:

The tool is held in the left hand and the blade 6 of the knife is introduced vertically between the rollers and moved up and down substantially in the direction of the axes of the disks. The lower edges of the disks are, as shown in Fig. 4, provided with sharp edges, so that they exert a scraping action upon the blade and by removing some of the material reduce the thickness of the cutting edge and thus sharpen it. The knife after being sharpened by a few up and down movements between the stationary disks is then turned into the horizontal position and moved forwards and backwards a few times, whereby the disks are made to revolve and acting as rollers upon the blade smoothes and polishes it.

By turning the disks 3 always fresh cutting edges upon them are made to act upon the knife blade, so that the grinding rollers may be used for a long time. When it is necessary to replace them by new ones this can easily be done by unscrewing the pins 4, removing the blunt disks, putting sharp ones in their place and screwing the pins 4 in again. Instead of mounting the disks 3, 3 upon pins, they may be secured in place by balls $4^1$ engaging semi-spherical recesses 13 (Fig. 7) in the centre of the disks, and the springy extensions 2, 2 of the handle 1, as shown in Figs. 5 and 6. This construction obviates the provision of central perforations in the disks, which may prove a source of trouble during the hardening of the disks. The disks 2, 2 may also be provided with semi-circular recesses 7 disposed in a circle on the underside which somewhat retard the rotation of the disks upon their support which is useful when polishing the sharpened blades between the disks. By means of the winged screw 5 upon the spring bow forming the handle the contact pressure between the disks may be regulated.

In the hereinbefore described sharpener it may happen that when the knife is moved forwards and backwards the point slips off the disks and hurts the user. In the preferred form of the tool shown in Figs. 8-11 this is rendered entirely impossible. Referring to these figures it will be seen that the disks 3, 3 are mounted in the eyes of a spring bow 8 and are disposed in a plane parallel to the vertical plane through the handle and not in a plane at right angles to it, as in the first described construction. When the blade is horizontally drawn through the disks, it moves at right angles to the handle and should the point hereby slip off it cannot possibly hurt the hands of the user. Through the branches of the bow 8 is passed a headed bolt 9, by which the bow 8 is fixed upon the handle through which it passes from end to end and passes a little beyond it, where it is provided with external screw-thread with which engages the internal thread of a nut 10 abutting against the end of the handle. By screwing the nut 10 tight, the branches of the loop are drawn together and the contact pressure between the disks increased. When the nut 10 is released, the arms of the spring bow open and the contact pressure between the disks is diminished or quite removed. The pressure between the disks may thus be easily and accurately adjusted. To prevent the bow 8 from turning upon the handle 1 the inner end of the handle is fitted with a ferrule 11 firmly fixed upon it and adapted to engage by noses 12 corresponding recesses in the bow. These means are only described by way of example. The disks or rollers 3 may be rounded at their base so that their contact takes place somewhat higher up where their diameters are largest.

It will be understood that various changes in the form, proportion, size and minor details of the new tool or device may be made within the scope of the claims without departing from the spirit or sacrificing any of the advantages of the invention.

What I claim as my invention and desire to secure by Letters Patent of the United States is:

1. A tool for sharpening cutting blades, comprising in combination, a suitable handle and a pair of contacting spherical disks or rollers of hard material, each of said rollers being rotatably mounted upon a pin carried by said handle in such a manner that the blade may be drawn through between them either substantially parallel with or at right angles to their axes of rotation.

2. A tool for sharpening cutting blades, comprising in combination, a suitable handle and a pair of contacting spherical disks or rollers of hard material, each of said rollers being rotatably mounted upon a pin carried by said handle in such a manner that the blade may be drawn through between them either substantially parallel with or at right angles to their axes of rotation, and means for adjusting the pressure between said disks or rollers.

3. A tool for sharpening cutting blades, comprising in combination, a suitable handle, a pair of contacting spherical disks or rollers of hard material, said disks being dished at their undersides to form sharp cutting edges and being rotatably mounted upon said handle in such a manner, that the blade may be drawn through between them substantially parallel or at right angles to their axes of rotation, and means for adjusting the pressure between said disks or rollers.

4. A tool for sharpening cutting blades, comprising in combination, a suitable handle and a pair of contacting spherical disks or rollers of hard material, each of said rollers being mounted upon a pin carried by said handle in such a manner that their axes of rotation are situated at right angles to the axis of the handle and so that the blade may be drawn through between them either substantially parallel with or at right angles to their axes of rotation without endangering the user.

5. A tool for sharpening cutting blades, comprising in combination, a suitable handle and a pair of contacting spherical disks or rollers of hard material mounted between central ball bearings upon said handle in such a manner that the blade may be drawn through between them substantially parallel or at right angles to their axes of rotation.

In testimony whereof I affix my signature.

KNUT WALDEMAR HEYMAN.